US010451935B2

(12) United States Patent
Huang et al.

(10) Patent No.: US 10,451,935 B2
(45) Date of Patent: Oct. 22, 2019

(54) ELECTRONIC DEVICE COMPRISING FIRST AND SECOND CONDUCTIVE LAYERS EACH HAVING SEGMENTS CORRESPONDING TO AND SEPARATED FROM EACH OTHER AND A CONNECTION LINE IN A PERIPHERAL REGION

(71) Applicant: Au Optronics Corporation, Hsinchu (TW)

(72) Inventors: Kun-Lung Huang, Taichung (TW); Ping-Hung Shih, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/396,757

(22) Filed: Apr. 28, 2019

(65) Prior Publication Data

US 2019/0285929 A1  Sep. 19, 2019

Related U.S. Application Data

(63) Continuation of application No. 16/009,210, filed on Jun. 15, 2018, now Pat. No. 10,274,795.

(30) Foreign Application Priority Data

Mar. 15, 2018  (TW) .............................. 107108899 A

(51) Int. Cl.
*G02F 1/1345* (2006.01)
*G02F 1/1362* (2006.01)
*G02F 1/1333* (2006.01)
*G02F 1/1335* (2006.01)

(52) U.S. Cl.
CPC ........ *G02F 1/13452* (2013.01); *G02F 1/1345* (2013.01); *G02F 1/1362* (2013.01); *G02F 1/13454* (2013.01); *G02F 1/13458* (2013.01); *G02F 2001/133388* (2013.01);
(Continued)

(58) Field of Classification Search
None
See application file for complete search history.

(56) References Cited

U.S. PATENT DOCUMENTS

2014/0300852 A1*  10/2014  Yoshida ................ G02F 1/1339
                                                                  349/143
2015/0301370 A1*  10/2015  Moriwaki ............. G02F 1/1339
                                                                  349/42
2017/0176827 A1*  6/2017  Kawata ............. G02F 1/133345
(Continued)

*Primary Examiner* — Paul C Lee
(74) *Attorney, Agent, or Firm* — JCIPRNET

(57) ABSTRACT

An electronic device includes a substrate, a first conductive layer, a second conductive layer, and a third conductive layer. The first conductive layer includes at least two first segments and at least one first connection line. The first connection line is connected to the at least two first segments. The second conductive layer includes at least two second segments and at least one second connection line. The at least two second segments do not overlap the at least two first segments in a normal direction of the substrate. The second connection line connects the at least two second segments. The second connection line overlaps the first connection line in the normal direction of the substrate. The third conductive layer includes at least one first connection electrode. The first connection electrode is electrically connected to the at least two first segments and the at least two second segments.

14 Claims, 11 Drawing Sheets

(52) U.S. Cl.
CPC ............ *G02F 2001/133612* (2013.01); *G09G 2300/0426* (2013.01)

(56) References Cited

U.S. PATENT DOCUMENTS

| | | | |
|---|---|---|---|
| 2017/0205926 A1* | 7/2017 | Noguchi | G02F 1/133305 |
| 2017/0249910 A1* | 8/2017 | Tamaki | G02F 1/1341 |
| 2017/0255298 A1* | 9/2017 | Choi | G06F 3/0414 |

* cited by examiner

ELECTRONIC DEVICE COMPRISING FIRST AND SECOND CONDUCTIVE LAYERS EACH HAVING SEGMENTS CORRESPONDING TO AND SEPARATED FROM EACH OTHER AND A CONNECTION LINE IN A PERIPHERAL REGION

CROSS-REFERENCE TO RELATED APPLICATION

This application is a continuation application of and claims the priority benefit of U.S. application Ser. No. 16/009,210, filed on Jun. 15, 2018, now allowed, which claims the priority benefit of Taiwan application serial no. 107108899, filed on Mar. 15, 2018. The entirety of each of the above-mentioned patent applications is hereby incorporated by reference herein and made a part of this specification.

BACKGROUND

Technical Field

The disclosure relates to an electronic device. More particularly, the disclosure relates to an electronic device including a pressing pad.

Description of Related Art

As technology advances, resolutions of display devices increase. Nevertheless, increasing conductive lines are required to be disposed in the same size of area in a display device for providing higher resolution for the display device, and consequently, the widths of the conductive lines are required to be reduced. Nevertheless, because of excessive electrical impedance, finer conductive lines may not withstand the current and thus may be burned out more easily, and the resolution of the display region can not be smoothly increased as a result. Therefore, a method is needed urgently to solve the foregoing problem.

SUMMARY

The disclosure provides an electronic device capable of addressing a problem of excessively great electrical impedance and lowering process difficulty in a chip bonding process. Further, a problem of mura generated at an edge (e.g., a corner) of an electronic device (e.g., a display panel) caused by heat concentration on a portion of a conductive line (e.g., a signal connection line) with greater electrical impedance and/or excessive heat accumulation of a plurality of conductive lines (e.g., signal connection lines) at a high resolution (e.g., a resolution of 4K or greater, preferably 8K or greater) can also be addressed.

In an embodiment of the disclosure, an electronic device includes a substrate, at least one subpixel, at least one signal line, a first conductive layer, a second conductive layer, a first insulation layer, a second insulation layer, and a third conductive layer. The substrate has a display region and at least one peripheral region located on at least one side of the display region. The subpixel is located at the display region. The signal line is disposed on the substrate and is electrically connected to the subpixel. The first conductive layer is disposed on the substrate and includes at least two first segments and at least one first connection line. The at least two first segments are disposed on the peripheral region and are separated from each other. The first connection line is disposed on the peripheral region and is connected to the at least two first segments. The second conductive layer is disposed on the substrate and includes at least two second segments and at least one second connection line. The at least two second segments are disposed on the peripheral region and are separated from each other. The at least two second segments are not overlapped with the at least two first segments in a normal direction of the substrate. The at least one second connection line is disposed on the peripheral region and is connected to the at least two second segments. The at least one second connection line is overlapped with the at least one first connection line in the normal direction of the substrate to basically form an overlapping region. The at least one first connection line and the at least one second connection line are electrically connected to each other to form a portion of at least one signal connection line and to be electrically connected to the at least one signal line. The first insulation layer is disposed between the first conductive layer and the second conductive layer. The second insulation layer is disposed on the second conductive layer. The first insulation layer and the second insulation layer have at least two first contact windows respectively corresponding to the at least two first segments. The second insulation layer further includes at least two second contact windows respectively corresponding to the at least two second segments. A thickness of the second insulation layer on the at least one first connection line and the at least one second connection line is A. A thickness of the second insulation layer on the at least two first segments and the at least two second segments is B, and A>B. The third conductive layer is disposed on the substrate and includes at least one first connection electrode and at least one electrode. The at least one first connection electrode is disposed on the second insulation layer and is electrically connected to the at least two first segments and the at least two second segments through the at least two first contact windows and the at least two second contact windows. The at least one first connection electrode, the at least two first segments, and the at least two second segments basically form at least one pressing pad and are electrically connected to the at least one signal connection line. The at least one electrode is disposed at the subpixel.

In an embodiment of the disclosure, an electronic device includes a substrate, at least one subpixel, at least one signal line, a first conductive layer, a second conductive layer, a first insulation layer, a second insulation layer, and a third conductive layer. The substrate has a display region and at least one peripheral region located on at least one side of the display region. The at least one subpixel is located at the display region. The at least one signal line is disposed on the substrate and electrically connected to the at least one subpixel respectively. The first conductive layer is disposed on the substrate and includes at least one first segment and at least one first connection line. The at least one first segment is disposed on the peripheral region. The at least one first connection line is disposed on the peripheral region and is connected to the at least one first segment. The second conductive layer is disposed on the substrate and includes at least one second segment and at least one second connection line. The at least one second segment is disposed on the peripheral region. The at least one second segment is not overlapped with the at least one first segment in a normal direction of the substrate. The at least one second connection line is disposed on the peripheral region. The at least one second connection line is connected to the at least one second segment. The at least one second connection line is overlapped with the at least one first connection line in the normal direction of the substrate to form an overlapping region. The at least one first connection line and the at least one second connection line are electrically connected to each other to basically form a portion of at least one repair line and to be interlaced with the at least one signal line. The first insulation layer is disposed between the first conductive layer and the second conductive layer. The second insulation layer is disposed on the second conductive layer. The first insulation layer and the second insulation layer have at least one first contact window corresponding to the at least one first segment. The second insulation layer further includes at least one second contact window corresponding to the at least one second segment. A thickness of the second insulation layer on the at least one first connection line and the at least one second connection line is A. A thickness of the second insulation layer on the at least one first segment and the at least one second segment is B, and A>B. The third conductive layer is disposed on the substrate and includes at least one first connection electrode and at least one electrode. The at least one first connection electrode is disposed on the second insulation layer and is electrically connected to the at least one first segment and the at least one second segment through the at least one first contact window and the at least one second contact window. The at least one first connection electrode, the at least one first segment, and the at least one second segment basically form at least one bonding pad and are electrically connected to the repair line. The at least one electrode is disposed at the at least one subpixel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
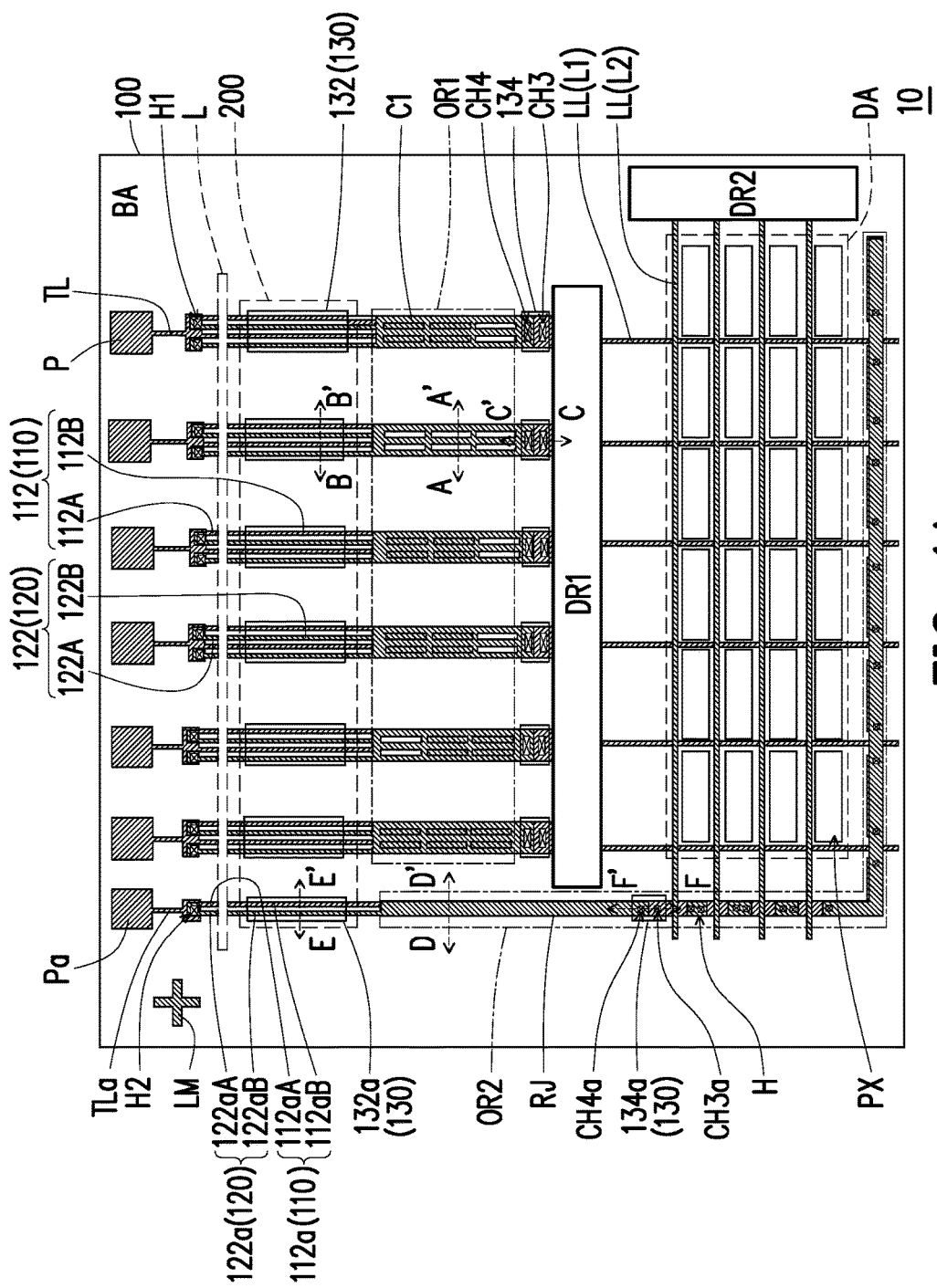
FIG. 1A is a schematic top view of an electronic device according to an embodiment of the disclosure.

Various embodiments of the disclosure are disclosed in the drawings, and for the sake of clarity, many of the practical details are set forth in the following description. However, it should be understood that these practical details should not be used to limit the disclosure. In other words, these practical details are not necessary in some of the embodiments of the disclosure. In addition, to simplify the drawings, some conventional structures and elements in the drawings will be shown in a simple and schematic manner.

In the accompanying drawings, thicknesses of layers, films, panels, regions and so on are exaggerated for clarity. Throughout the specification, the same reference numerals in the accompanying drawings denote the same elements. It should be understood that when an element such as a layer, film, region or substrate is referred to as being "on" or "connected to" another element, it can be directly on or connected to the other element, or intervening elements may also be present. In contrast, when an element is referred to as being "directly on" or "directly connected to" another element, there are no intervening elements present. As used herein, the term "connected" may refer to physically connected and/or electrically connected (or coupled). Therefore, the electrical connection (or coupling) between two devices may include intervening elements existing between the two devices.

It should be understood that, although the terms "first", "second", etc., may be used herein to describe various elements, components, regions, layers and/or sections, these elements, components, regions, layers, and/or sections should not be limited by these terms. These terms are used to distinguish one element, component, region, layer or section from another element, component, region, layer or section.

The terminology used herein is for the purpose of describing particular embodiments and is not intended to be limiting of the disclosure. As used herein, the singular forms "a," "an" and "the" are intended to include the plural forms as well, unless the context clearly indicates otherwise. "or" represents "and/or". The term "and/or" used herein includes any or a combination of one or more of the associated listed items. It will be further understood that the terms "comprises," "comprising," "includes" and/or "including," when used herein, specify the presence of stated features, regions, integers, steps, operations, elements, and/or components, but do not preclude the presence or addition of one or more other features, regions, integers, steps, operations, elements, components, and/or groups thereof.

Moreover, relative terms such as "below" or "bottom" and "above" or "top" may serve to describe the relation between one component and another component in the text according to the illustration of the drawings. It should also be understood that the relative terms are intended to include different orientations of a device in addition to the orientation shown in the drawings. For example, if a device in the drawings is flipped, a component described as being disposed "below" other components shall be re-orientated to be "above" other components. Thus, the exemplary term "below" may cover the orientations of "below" and "above", depending on a specific orientation of the drawings. Similarly, if a device in a figure is flipped over, the element originally described to be located "below" or "underneath" other element is oriented to be located "on" the other element. Therefore, the illustrative term "under" or "below" may include orientations of "above" and "under".

The term "about" or "substantially" as used herein is inclusive of the stated value and means within an acceptable range of deviation for the particular value as determined by persons of ordinary skill in the art, considering the measurement in question and the error associated with measurement of the particular quantity (i.e., the limitations of the measurement system). For example, "about" may mean within one or more standard deviations, or within, for example, ±30%, ±20%, ±15%, ±10%, ±5% of the stated value. Moreover, a relatively acceptable range of deviation or standard deviation may be chosen for the term "about" or "substantially" as used herein based on optical properties, etching properties or other properties, instead of applying one standard deviation across all the properties.

Unless otherwise defined, all terms (including technical and scientific terms) used herein have the same meaning as commonly understood by persons of ordinary skill in the art. It will be further understood that terms, such as those defined in commonly used dictionaries, should be interpreted as having a meaning that is consistent with their meaning in the context of the relevant art and the disclosure and will not be interpreted in an idealized or overly formal sense unless expressly so defined herein.

Figure 1B:
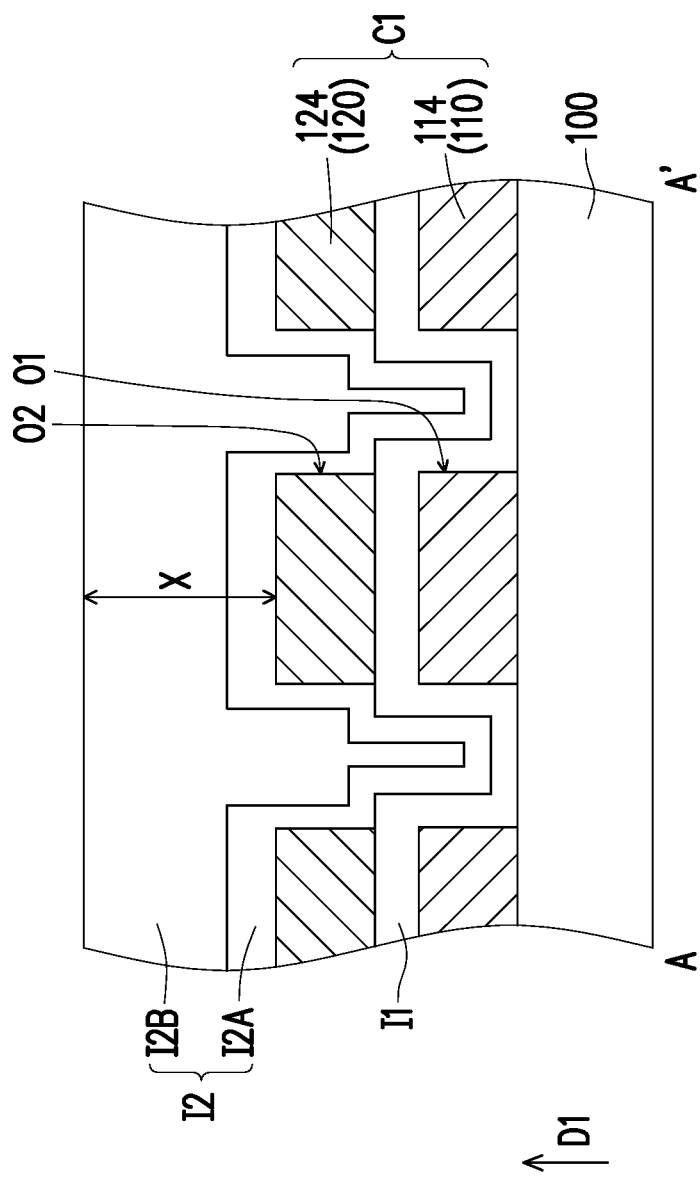
FIG. 1B is a schematic cross-sectional view taken along a line AA' depicted in FIG. 1A.
Figure 1C:
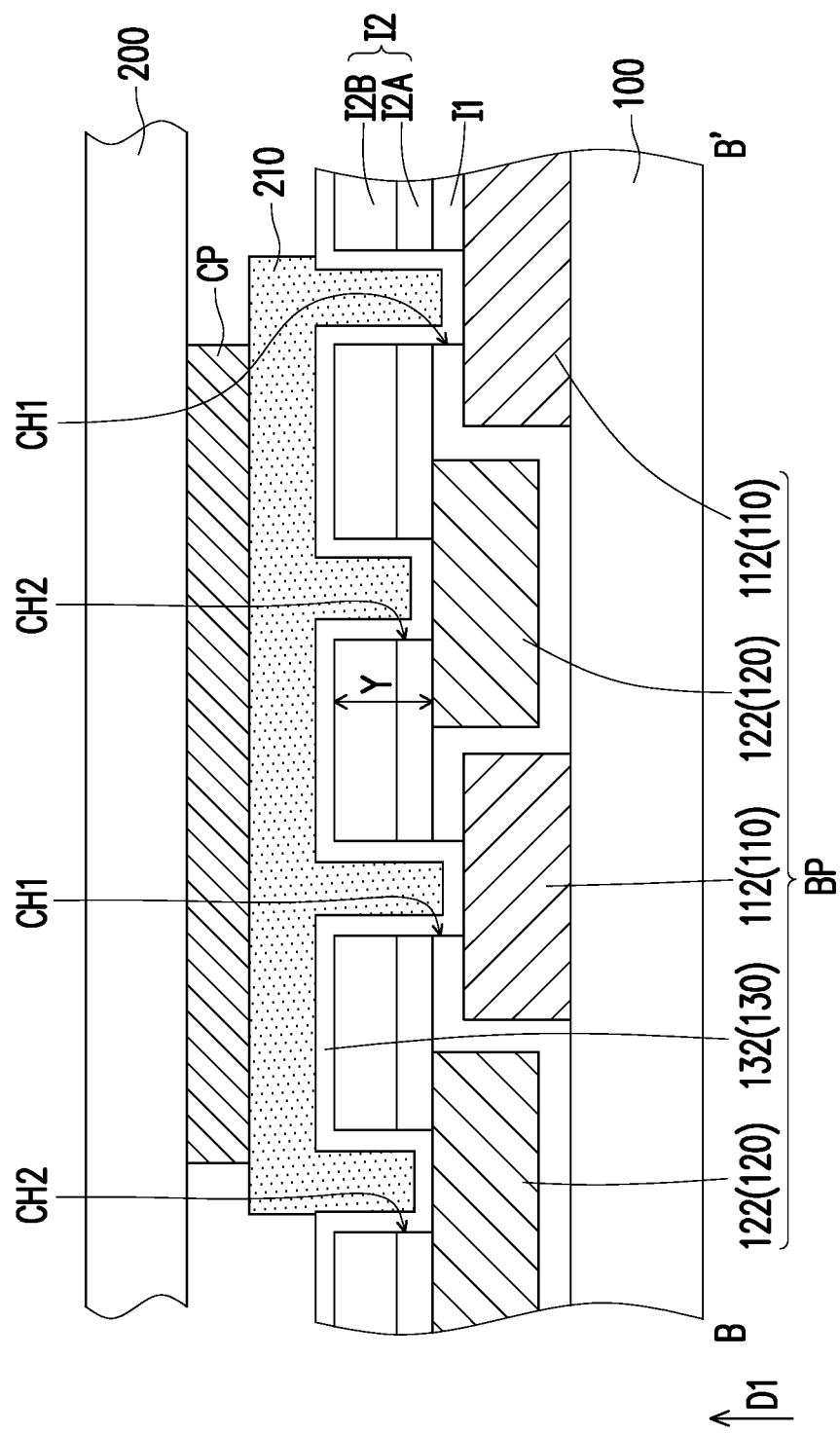
FIG. 1C is a schematic cross-sectional view taken along a line BB' depicted in FIG. 1A.
Figure 1D:
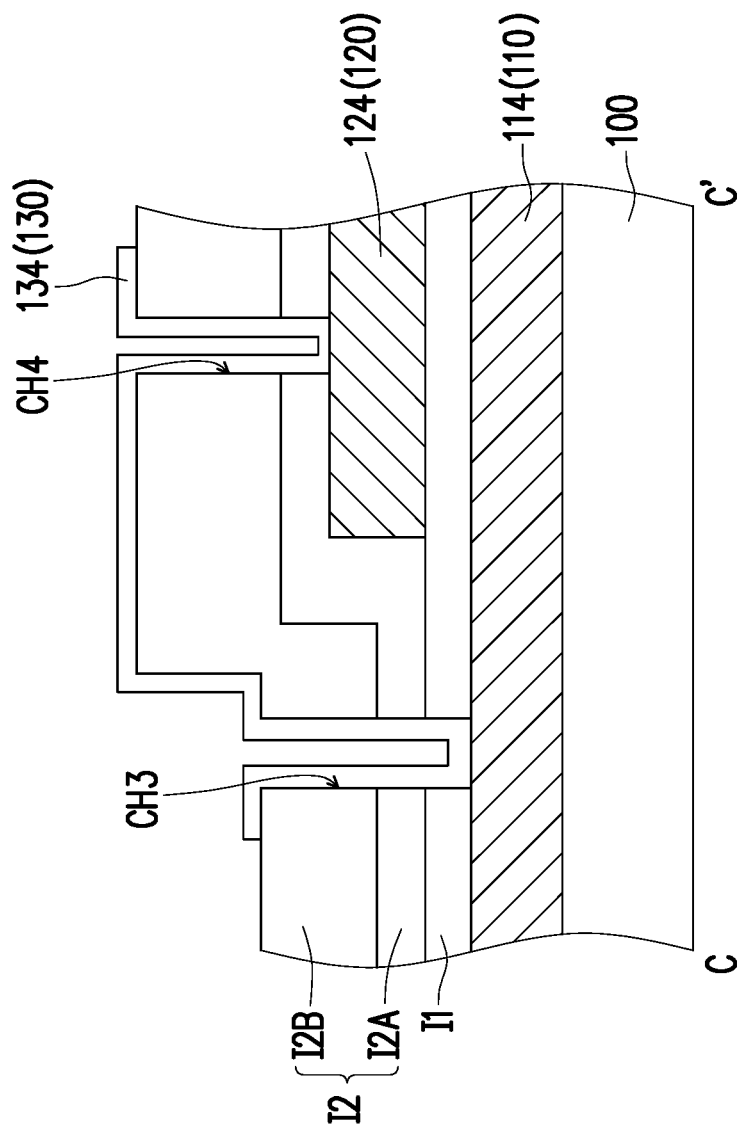
FIG. 1D is a schematic cross-sectional view taken along a line CC' depicted in FIG. 1A.
Figure 1E:
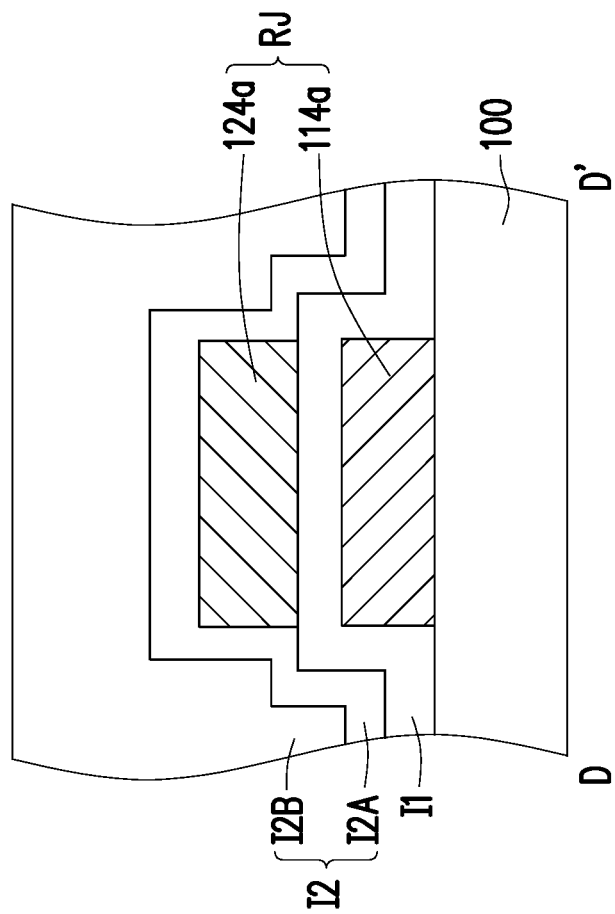
FIG. 1E is a schematic cross-sectional view taken along a line DD' depicted in FIG. 1A.
Figure 1F:
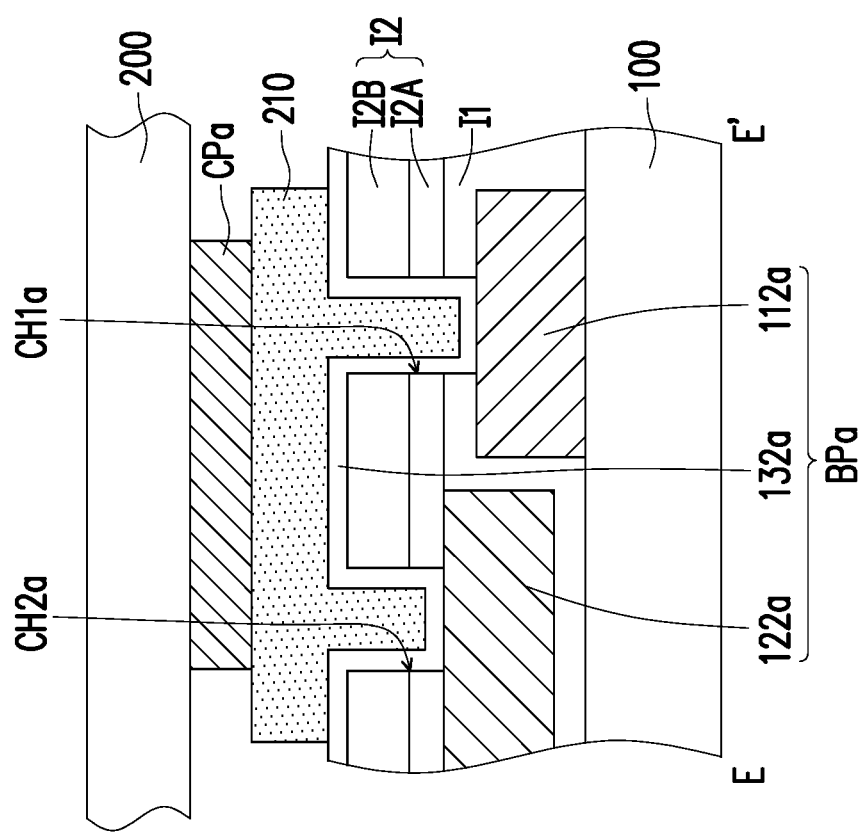
FIG. 1F is a schematic cross-sectional view taken along a line EE' depicted in FIG. 1A.

FIG. 1A is a schematic top view of an electronic device according to an embodiment of the disclosure. FIG. 1B is a schematic cross-sectional taken along a line AA' depicted in FIG. 1A. FIG. 1C is a schematic cross-sectional view taken along a line BB' depicted in FIG. 1A. FIG. 1D is a schematic cross-sectional view taken along a line CC' depicted in FIG. 1A. FIG. 1E is a schematic cross-sectional view taken along a line DD' depicted in FIG. 1A. FIG. 1F is a schematic cross-sectional view taken along a line EE' depicted in FIG. 1A.

Referring to FIG. 1A, FIG. 1B, and FIG. 1C, an electronic device 10 includes a substrate 100, subpixels PX, signal lines LL (e.g., a signal line L1), a first conductive layer 110, a second conductive layer 120, a first insulation layer I1, a second insulation layer I2, and a third conductive layer 130.

The substrate 100 has a display region DA and a peripheral region BA located on at least one side of the display region DA. The subpixels PX may be located in the display region DA, but is not limited thereto. In other embodiments, the subpixels PX may also be located in the display region DA and a portion of the peripheral region BA. At least one signal line LL (e.g., the signal line L1 and/or a signal line L2) is disposed on the substrate 100 and is electrically connected to the subpixels respectively.

The first conductive layer 110 is disposed on the substrate 100 and includes at least two segments 112 and at least one connection line 114. The segments 112 are disposed on the peripheral region BA and are separated from each other. The at least one connection line 114 is disposed on the peripheral region BA and is connected to the corresponding at least two segments 112. The at least one connection line 114 is exemplified by being connected to the two segments 112 in this embodiment, which should however not be construed as limitations to the disclosure. In other embodiments, each of the at least one connection line 114 is connected to three or more segments 112, as such, current is distributed and electrical impedance is lowered as plural segments 112 are used.

The second conductive layer 120 is disposed on the substrate 100 and includes at least two segments 122 and at least one connection line 124. The segments 122 are disposed on the peripheral region BA and are separated from each other. The segments 122 are not overlapped with the segments 112 in a normal direction D1 of the substrate 100. In other words, the segments 122 are not overlapped with the segments 112 in a vertical projected direction on the substrate 100. The at least one connection line 124 is disposed on the peripheral region BA and is connected to the corresponding at least two segments 122. The at least one connection line 124 is exemplified by being connected to the two segments 122 in this embodiment, which should however not be construed as limitations to the disclosure. In other embodiments, each of the at least one connection line 124 is connected to three or more segments 122, as such, current is distributed and electrical impedance is lowered as plural segments 122 are used. In this embodiment, one of the segments 112 is located between the at least two segments 122, that is, the segments 112 and the segments 122 are arranged in an alternating arrangement manner or in a staggered arrangement manner, but are not limited thereto.

Referring to FIG. 1A and FIG. 1B, the connection line 124 may at least be partially overlapped with the connection line 114 in the normal direction D1 of the substrate 100 to basically form an overlapping region OR1. Preferably, the connection line 124 may be overlapped with the connection line 114 in the normal direction D1 of the substrate 100 to basically form the overlapping region OR1. In other words, the connection line 124 may at least be partially overlapped with the connection line 114 in the projection direction perpendicular to the substrate 100 to basically form the overlapping region OR1. The connection line 124 and the connection line 114 are electrically connected to each other to form a portion of a signal connection line C1 and to be electrically connected to the corresponding signal lines LL (e.g., the signal line L1). In other words, the portion of a signal connection line C1 can be electrically connected to the corresponding signal lines LL (e.g., the signal line L1).

In this embodiment, the connection line 114 may include a plurality of first openings O1. The connection line 124 may include a plurality of second openings O2. At least a portion of the first openings O1 and at least a portion of the second openings O2 are located in the overlapping region OR1. As portions of the first opening O1 and the second opening O2 are overlapped, the first openings O1 and the second openings O2 preferably are overlapped completely. When a sealant is disposed in the overlapping region OR1, a light can pass through the first openings O1 and the second openings O2. As such, the sealant in the overlapping region OR1 may be cured more preferably.

The first insulation layer I1 is disposed between the first conductive layer 110 and the second conductive layer 120. In this embodiment, the first insulation layer I1 may be a single-layered insulation layer, but not limited thereto. In other embodiments, the first insulation layer I1 may be constituted by two or more insulation layers. In this embodiment, the first insulation layer I1 may be, for example, a gate insulation layer, but not limited thereto. A material of the first insulation layer I1 may include an inorganic material (e.g., silicon oxide, silicon oxynitride, silicon nitride, or other suitable materials), an organic material (e.g., a photoresist material, polyimide, poly(methyl methacrylate), or other suitable materials), or other suitable materials, or a combination of the foregoing.

Referring to FIG. 1A and FIG. 1C, the second insulation layer I2 is disposed on the second conductive layer 120. The first insulation layer I1 and the second insulation layer I2 both have at least two contact windows CH1 respectively corresponding to the at least two segments 112. The second insulation layer I2 further includes at least two contact windows CH2 respectively corresponding to the at least two segments 122. In this embodiment, the second insulation layer I2 includes two layers of an insulation layer I2A and an insulation layer I2B, but not limited thereto. In other embodiments, the second insulation layer I2 may be constituted by a single-layered insulation layer or by three or more insulation layers. In some embodiments, the insulation layer I2A may be a passivation layer (e.g., an inorganic material), and the insulation layer I2B is a planar layer (e.g., an organic material), which should however not be construed as limitations to the disclosure.

Referring to FIG. 1A, FIG. 1B, and FIG. 1C together, a thickness of the second insulation layer I2 on the connection line 114 and the connection line 124 is X, a thickness of the second insulation layer I2 on the at least two segments 112 and the at least two second segments 122 is Y, and the thickness X is greater than the thickness Y. Herein, the thickness X refers to, for example, a distance between an upper surface of the connection line 124 and an upper surface of the second insulation layer I2, and the thickness Y refers to, for example, a distance between an upper surface of the segment 112 and the upper surface of the second insulation layer I2. In some embodiments, X is approximately 1.5 microns to 1.8 microns, but is not limited thereto. In some embodiments, Y is approximately 0.8 microns to 1.0 microns, but is not limited thereto.

The third conductive layer 130 is disposed on the substrate 100 and includes at least one connection electrode 132 and at least one electrode E (shown in FIG. 1H) or at least one connection electrode 132. The at least one connection electrode 132 is disposed on the second insulation layer I2 and is electrically connected to the at least two segments 112 and the at least two segments 122 through the at least two contact windows CH1 and the at least two contact windows CH2. The at least one connection electrode 132, the at least two segments 112, and the at least two segments 122 basically form a pressing pad BP and are electrically connected to the signal connection line C1. In other words, the pressing pad BP can be electrically connected to the signal connection line C1. Preferably, the third conductive layer 130 may be formed of a single-layered or a multi-layered structure. Moreover, a material of the third conductive layer 130 includes a transparent conductive material, for example, indium-tin-oxide, indium zinc oxide, aluminum doped zinc oxide, indium-gallium-zinc oxide, indium-gallium oxide, carbon nanotube or carbon nanorod, metal and/or alloy with a thickness less than about 60 angstroms, or other suitable materials. In some embodiments, the third conductive layer 130 may be formed of a non-transparent material or a combination combining a transparent material and the non-transparent material.

In some embodiments, the electronic device 10 further includes an electronic element 200. The electronic element 200 may include a circuit board (e.g., a flexible circuit board), a chip, or other suitable elements or a combination of the foregoing. The electronic element 200 has a bonding pad CP corresponding to the pressing pad BP to be electrically connected to the subpixel PX. In this embodiment, the pressing pad BP and the bonding pad CP are electrically connected through a conductive structure 210, for example. The conductive structure 210 is, for example, a solder material, a conductive paste containing a conductive part (e.g., a gold ball), a conductive paste, a conductive film, an anisotropic conductive paste, an anisotropic conductive film, or other suitable materials. In this embodiment, the thickness X of the second insulation layer I2 on the connection line 114 and the connection line 124 is greater than the thickness Y of the second insulation layer I2 on the segments 112 and the segments 122, as such, a bonding process of the electronic element 200 may be performed more easily. In this embodiment, the segments 122 and the segments 112 are not overlapped with each other. Hence, a portion of the first insulation layer I1 and a portion of the second insulation layer I2 on the segments 112 and the segments 122 are substantially more even compared to a portion of the insulation layer I1 and a portion of the second insulation layer I2 on the connection line 114 and the connection line 124. Therefore, the bonding process of the electronic element 200 may be performed with less difficulty. For instance, the second insulation layer I2 is less likely to be peeled off in the bonding process of the electronic element 200, and that the bonding process of the electronic element 200 may be performed with reduced difficulty. In this embodiment, the non-overlapping segments (e.g. the segments 112 is not overlapped with the segments 122 and may be regarded as having one layer respectively) are connected to the overlapping connection lines (e.g. connection line 124 and the connection line 114 are overlapped) at the overlapping region OR1 (e.g. the overlapping region OR1 may be regarded as having two layers of conductive layers), and that the signal connection line C1 connected to the signal line LL has lower electrical impedance. In other words, the bonding process with reduced difficulty is maintained and electrical impedance of the signal connection line C1 connected to the signal line LL may be lowered in this embodiment. In this way, the problem of heat accumulation on a portion of a conductive line (e.g., the signal connection line C1) with greater electrical impedance and/or heat accumulation of a plurality of conductive lines (e.g., the signal connection line C1) at a high resolution (e.g., a resolution of 4K or greater, preferably 8K or greater) in the electronic device 10 (e.g., a display panel) is addressed. Therefore, an electronic device (e.g., a display panel) may be less prone to mura at an edge (e.g., a corner) of the electronic device 10 (e.g., a display panel) at a high resolution (e.g., a resolution of 4K or greater, preferably 8K). 4K resolution, for example, 3840 x2160 or 4096×2160 pixels, but is not limited thereto. 8K resolution, for example, 7680×4320 pixels, but is not limited thereto.

If the electronic element 200 is a circuit board (e.g., a flexible circuit board) and no chip is disposed thereon, at least one of a driver circuit DR1 and a driver circuit DR2 may be selectively disposed on the substrate 100 in this embodiment, which should however not be construed as limitations to the disclosure. If the electronic element 200 is a chip or a circuit board (e.g., a flexible circuit board) and a chip is disposed thereon, at least one of the driver circuit DR1 and the driver circuit DR2 may not have to be disposed on the substrate 100 in this embodiment.

The driver circuit DR1 is disposed on the substrate 100 and is electrically connected to the signal line LL (e.g., the signal line L1) and the signal connection line C1. The driver circuit DR2 is disposed on the substrate 100 and is electrically connected to the signal line LL (e.g., the signal line L2). At least one of the signal lines LL (e.g., the signal line L1 or the signal line L2) includes at least one scan line or at least one data line. For instance, one of the signal line L1 and the signal line L2 is the scan line, and the other one is the data line, wherein the signal line L1 is preferably the scan line and the driver circuit DR1 is preferably a gate driver circuit, but are not limited thereto. The gate driver circuit DR1 may be preferably formed on a substrate 10 together with a process of manufacturing a switch element T1 and/or a driving element T2 and at least one capacitor C described in the following FIG. 1, but is not limited thereto.

In this embodiment, the signal connection line C1 and the signal line LL (e.g., the signal line L1) are exemplified by being electrically connected through the driver circuit DR1. Referring to FIG. 1A and FIG. 1D, the first insulation layer I1 and the second insulation layer I2 further include at least one contact window CH3, respectively. The second insulation layer I2 further includes at least one contact window CH4. The third conductive layer 130 further includes at least one connection electrode 134. The connection electrode 134 is disposed on the second insulation layer I2 and is electrically connected to the connection line 114 and the connection line 124 through the contact window CH3 and the contact windows CH4, and is also electrically connected to the segments 112 and the segments 122. The contact window CH3 and the contact window CH4 may be located between the overlapping region OR1 and the subpixel PX. In some embodiments, the contact window CH3 and the contact window CH4 are located in the driver circuit DR1, which should however not be construed as a limitation to the disclosure. In this embodiment, the signal connection line C1 is electrically connected to the driver circuit DR1 through the first conductive layer 110, which should however not be construed as a limitation to the disclosure. In other embodiments, the signal connection line C1 is electrically connected to the driver circuit DR1 through the second conductive layer 120, but is not limited thereto. In still another embodiment, as described in the foregoing embodiment, the signal connection line C1 and the signal line LL (e.g., the signal line L1) may be electrically connected to each other, and no additional driver circuit is required to be disposed to be electrically connected.

Figure 1G:
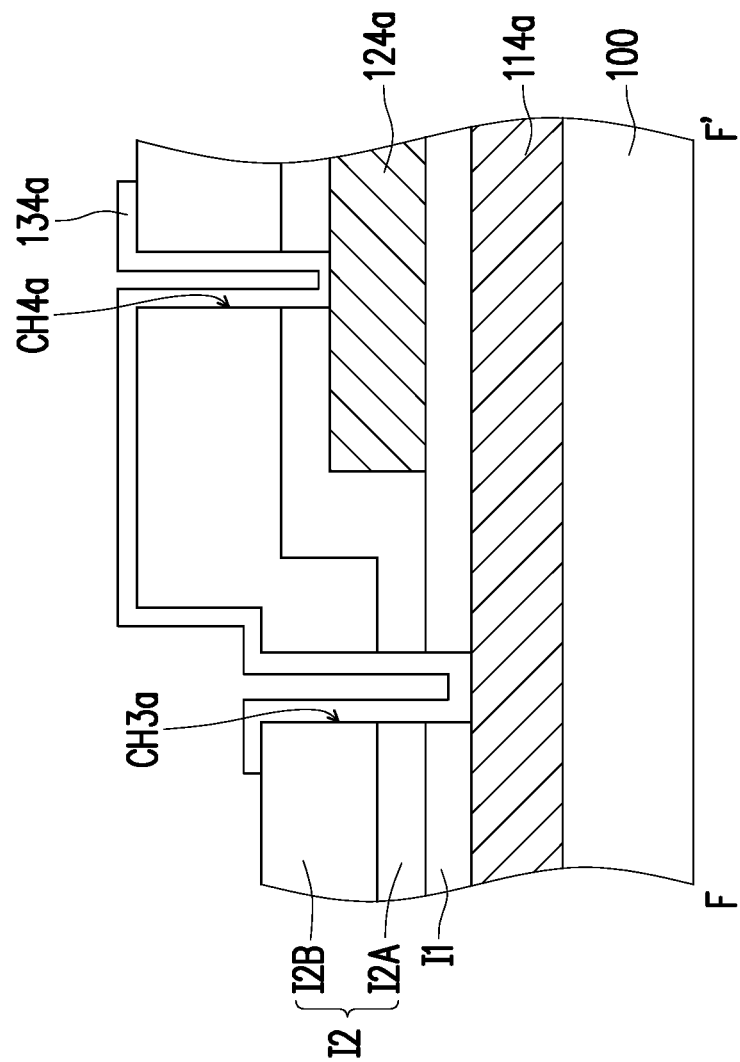
FIG. 1G is a schematic cross-sectional view taken along a line FF' depicted in FIG. 1A.
Figure 1H:
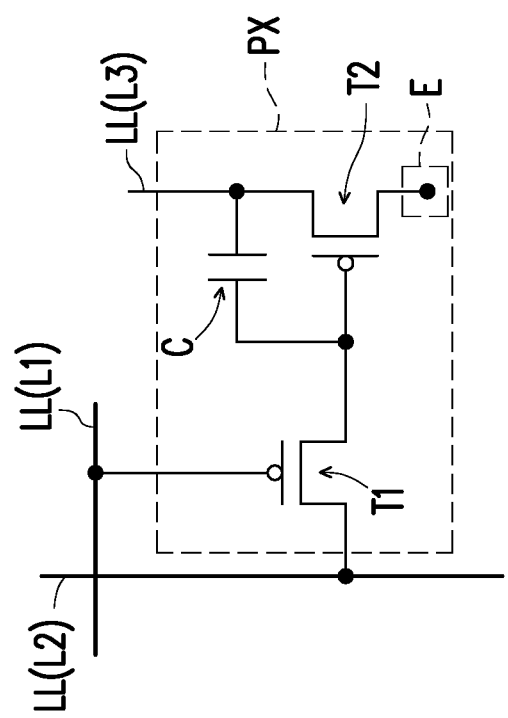
FIG. 1H is a schematic diagram of a circuit of a subpixel according to an embodiment of the disclosure.

Referring to FIG. 1A and FIG. 1H together, in this embodiment, if the subpixel PX driven by the electronic device 10 is a non-self-luminous subpixel, at least one switch element T1 and at least one capacitor C are included in the subpixel PX, for example. The at least one electrode E (e.g., a pixel electrode) of the third conductive layer 130 is disposed at the subpixel PX and is electrically connected to the switch element T1. The switch element T1 is electrically connected to at least one of the signal lines LL (e.g., the signal line L1 and/or the signal line L2). A material of a display medium in the non-self-luminous subpixel includes liquid crystal, an electrowetting material, an electrophoresis material, electric dust, or other suitable materials, or a combination of the foregoing. In other embodiments, if the subpixel PX driven by the electronic device 10 is a self-luminous subpixel, at least one switch element T1, at least one capacitor C, and at least one driving element T2 are included in the subpixel PX, for example. The at least one electrode E (e.g., a pixel electrode) of the third conductive layer 130 is disposed at the subpixel PX. The switch element T1 is electrically connected to at least one of the signal lines LL (e.g., the signal line L1 and/or the signal line L2). The driving element T2 is electrically connected to the capacitor C and the other signal line L3 (e.g., a high-power supply line, a low-power supply line, or other suitable segments). In some embodiments, the driving element T2 is electrically connected to the electrode E (e.g., a pixel electrode), but not limited thereto. In some embodiments, the subpixel PX may also include other active elements and passive elements. In part of the embodiments, a number of at least one of the switch element T1, the driving element T2, and the capacitor C may be changed as required to be greater than 1 or equal to 1. A material of a display medium in the self-luminous subpixel includes an organic material, an inorganic material, perovskite, or other suitable materials or a combination of the foregoing. At least one of the switch element T1 and the driving element T2 may be a N-type transistor, a P-type transistor, or other transistor of a suitable type, or a combination of the foregoing. A semiconductor layer of the transistor may be single-layered or multi-layered, and a material of the transistor includes amorphous silicon, polysilicon, microcrystalline silicon or nanocrystalline silicon, single-crystal silicon, a transparent semiconductor material, carbon nanotube or carbon nanorod, perovskite, or other suitable materials. The type of the transistor may be a bottom-gate type (e.g., the gate electrode is below the semiconductor layer), a top-gate type (e.g., the gate electrode is above the semiconductor layer), a vertical type (a current path of the semiconductor layer is not a plane), or other suitable types.

Referring to FIG. 1A, FIG. 1E, and FIG. 1F together, as for other implementation of this embodiment, the first conductive layer 110 may be selectively further include at least one segment 112a and at least one connection line 114a. The segment 112a and the connection line 114a are disposed on the peripheral region BA. The connection line 114a is connected to the segment 112a.

The second conductive layer 120 may be selectively further include at least one segment 122a and at least one connection line 124a. The segment 122a and the connection line 124a are disposed on the peripheral region BA. The segment 122a is not overlapped with the segment 112a in the normal direction D1 of the substrate 100. In other words, the segment 122a is not overlapped with the segment 112a in the vertical projected direction on the substrate 100. The connection line 124a is connected to the segment 122a. The connection line 124a is at least partially overlapped with the connection line 114a in the normal direction D1 of the substrate 100 to form another overlapping region OR2. In other words, the connection line 124a is at least partially overlapped with the connection line 114a in the vertical projected direction on the substrate 100 to form the another overlapping region OR2. Preferably, the connection line 124a is overlapped with the connection line 114a in the normal direction D1 of the substrate 100 to form the another overlapping region OR2. The connection line 114a and the connection line 124a are electrically connected to each other to basically form a portion of a repair line RJ and to be interlaced with at least one of the signal lines LL (e.g., the signal line L1 and/or the signal line L2).

In this embodiment, the first insulation layer I1 and the second insulation layer I2 further respectively include at least one contact window CH1a corresponding to the segment 112a. The second insulation layer I2 further includes at least one contact window CH2a corresponding to the segment 122a.

The third conductive layer 130 may further include at least one connection electrode 132a selectively. The connection electrode 132a is disposed on the second insulation layer I2 and is electrically connected to the segment 112a and the segment 122a through the contact window CH1a and the contact window CH2a. The connection electrode 132a, the segment 112a, and the segment 122a basically form at least one bonding pad BPa and are electrically connected to the repair line RJ. In other words, the at least one bonding pad BPa can be electrically connected to the repair line RJ.

Referring to FIG. 1A and FIG. 1G, the first insulation layer I1 and the second insulation layer I2 further respectively include a contact window CH3a, and the second insulation layer I2 further includes a contact window CH4a. The third conductive layer 130 may further include a connection electrode 134a selectively. The connection electrode 134a is disposed on the second insulation layer I2 and is electrically connected to the connection line 114a and the connection line 124a through the contact window CH3a and the contact windows CH4a and is electrically connected to the segment 112a and the segment 122a.

In this embodiment, the repair line RJ may selectively include a plurality of contact windows H. In some embodiments, a plurality of connection electrodes 134a are disposed into the contact windows H to be electrically connected to the connection lines 114a and the connection lines 124a, which should however not be construed as a limitation to the disclosure. In some embodiment, the connection lines 124a may are disposed into the contact windows H to be electrically connected to the connection lines 114a, and whether the connection electrodes 134a are present may be selectively determined according to requirement. The connection line 124a is divided or disconnected at a position in which the repair line RJ overlaps the signal line LL (e.g., the signal line L2), and the connection line 114a is divided or disconnected at a position in which the repair line RJ overlaps the signal line LL (e.g., the signal line L1). In this may, a short circuit is prevented from occurring at the repair line RJ and the signal lines LL (e.g., the signal line L1 and the signal line L2) when the electronic element 200 works normally.

In some embodiments, the electronic element 200 may selectively include a bonding pad CPa corresponding to the bonding pad BPa to be electrically connected to the repair line RJ, but is not limited thereto. In other embodiments, the bonding pad CPa corresponding to the bonding pad BPa is not required to be included, and the bonding pad of the repair line RJ may still be electrically connected to other required signal lines LL or a signal transmitted by the electronic element 200.

As for other implementation of this embodiment, the electronic device 10 may further include a test line TL and a test line TLa selectively, but is not limited thereto. The test line TL is disposed on the substrate 100 and is electrically connected to the segment 112 and the segment 122. The test line TLa is disposed on the substrate 100 and is electrically connected to the segment 112a and the segment 122a. In this embodiment, the test line TL and the test line TLa may belong to the first conductive layer 110. The segment 122 is electrically connected to the test line TL through the contact window H1, and the segment 122a is electrically connected to the test line TLa through the contact window H2, which should however not be construed as a limitation to the disclosure. In other embodiments, the test line TL and the test line TLa may belong to the second conductive layer 120 or other suitable film layers or a combination of the foregoing.

The test line TL may be electrically connected to a test pad P, and the test line TLa may be electrically connected to a test pad Pa. In this embodiment, the test line TL and the test pad P may be configured to test whether the signal lines LL (e.g., the signal line L1) works normally, and the test line TLa and the test pad Pa may be configured to test whether the repair line RJ works normally. After testing is performed, a laser cutting process may be used to allow a portion of the segment 112 and a portion of the segment 122 to be separated from the test line TL and to allow a portion of the segment 112a and a portion of the segment 122a to be separated from the test line TLa. For instance, the laser cutting process is performed and a cutting mark L is left. In some embodiments, an alignment mark LM may be used to aid in positioning a location of the cutting mark L. After the cutting process is performed, the segment 112 includes a first portion 112A and a second portion 112B separated from each other. The first portion 112A is connected to the test line TL, and the second portion 112B is connected to the corresponding connection line 114. The segment 122 includes a third portion 122A and a fourth portion 122B separated from each other. The third portion 122A is connected to the test line TL, and the fourth portion 122B is connected to the corresponding connection line 124. The segment 112a includes a first portion 112aA and a second portion 112aB separated from each other. The first portion 112aA is connected to the test line TLa, and the second portion 112aB is connected to the corresponding connection line 114a. The segment 122a includes a third portion 122aA and a fourth portion 122aB separated from each other. The third portion 122aA is connected to the test line TLa, and the fourth portion 122aB is connected to the corresponding connection line 124a. In some embodiments, a circuit line at a side of the cutting mark L (e.g., the test line TL connected and corresponding to the first portion 112A and the third portion 122A and the test line TLa corresponding to the first portion 112aA and the third portion 122aA), a portion of the substrate 100, and at least a portion of the alignment mark LM may also be removed.

Figure 2A:
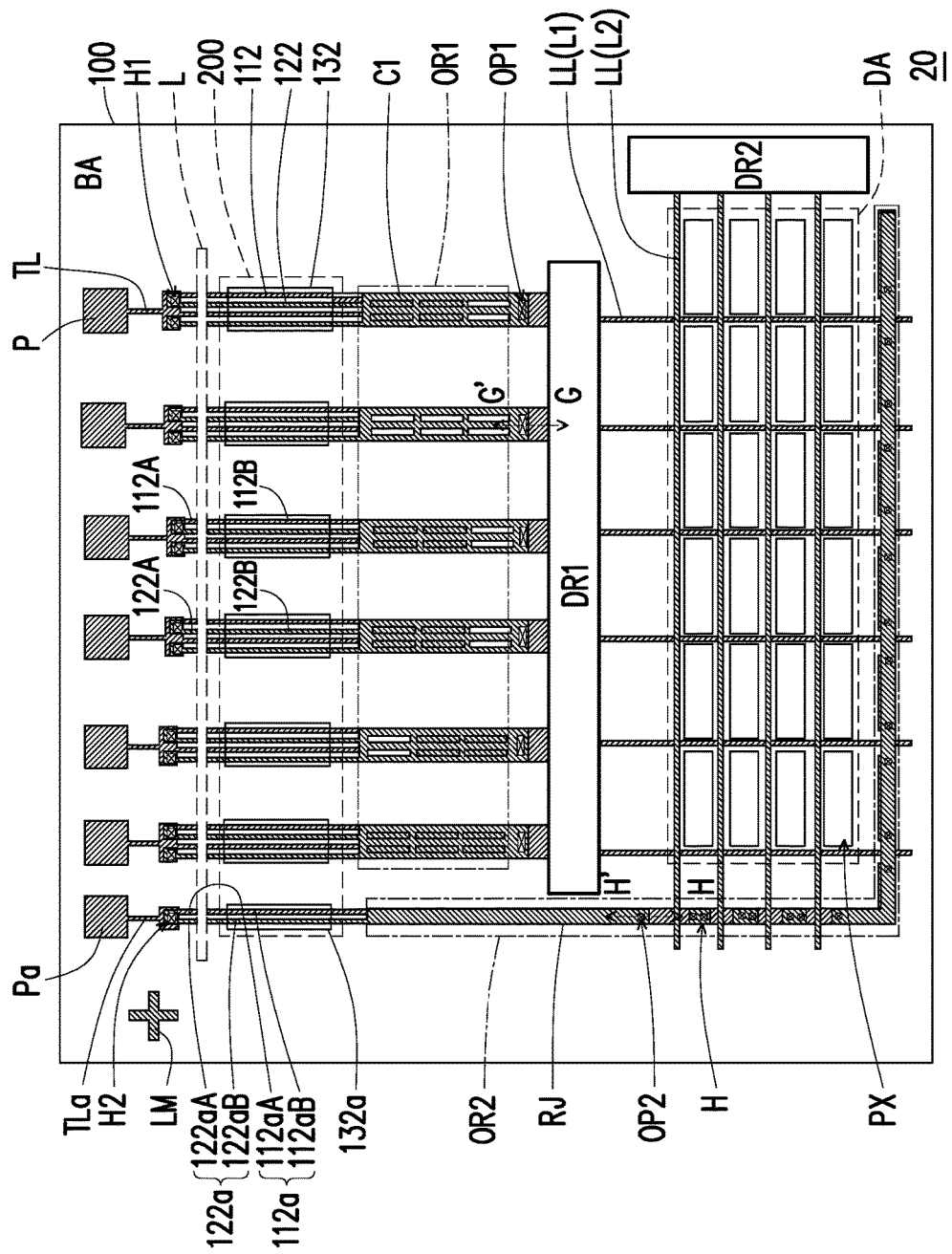
FIG. 2A is a schematic top view of an electronic device according to an embodiment of the disclosure.
Figure 2B:
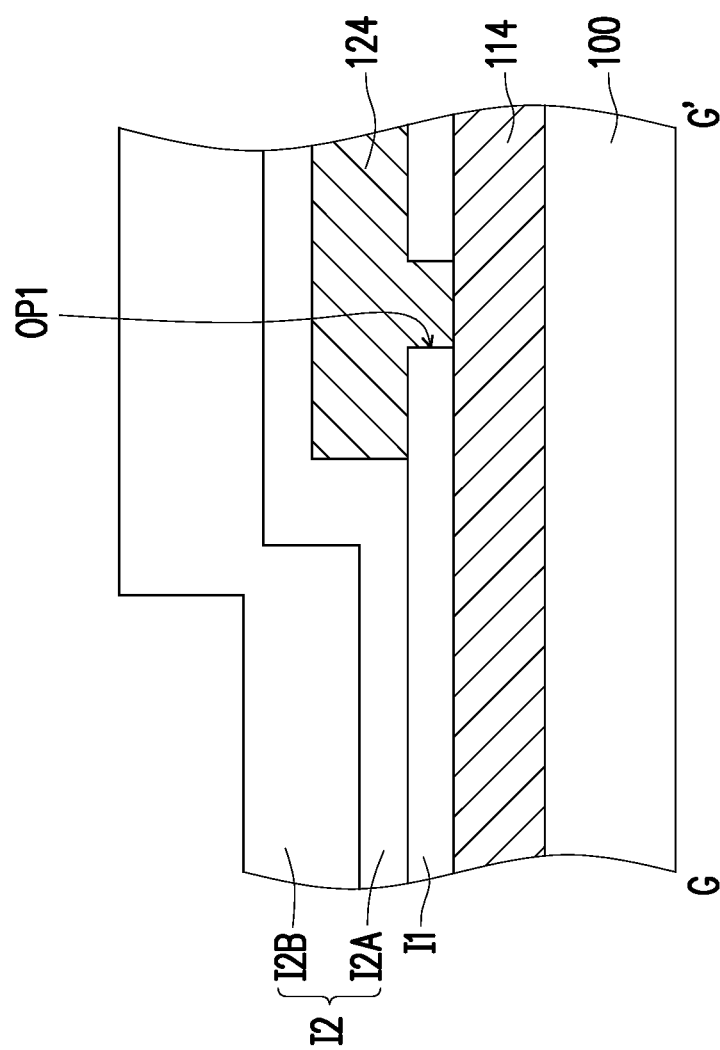
FIG. 2B is a schematic cross-sectional view taken along a line GG' depicted in FIG. 2A.
Figure 2C:
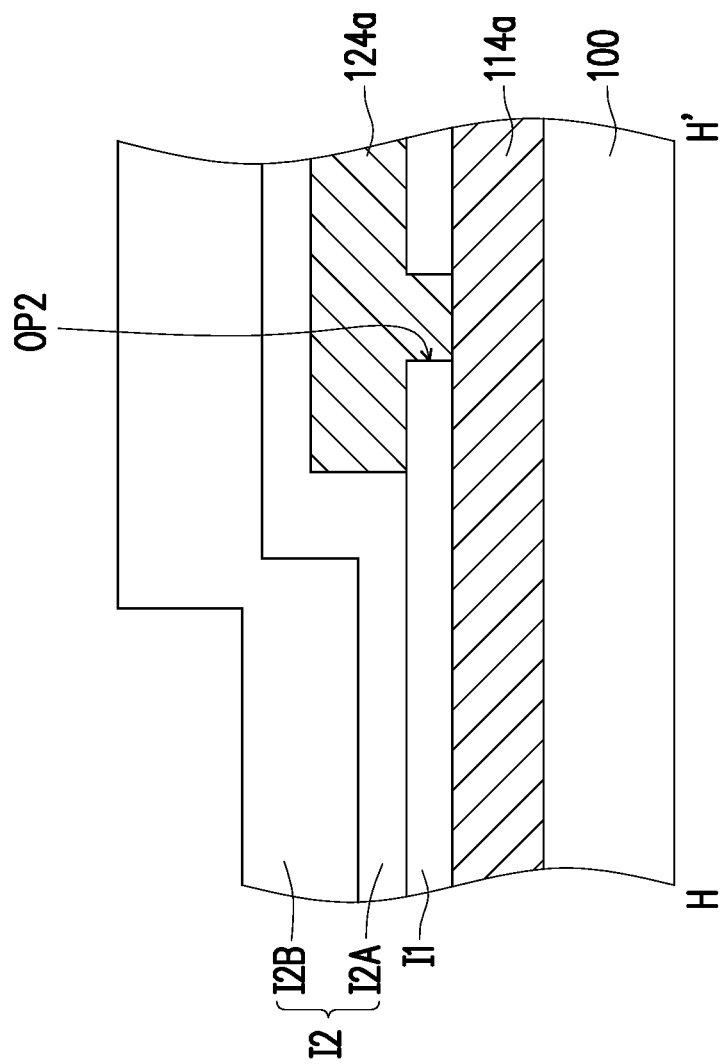
FIG. 2C is a schematic cross-sectional view taken along a line HH' depicted in FIG. 2A.

FIG. 2A is a schematic top view of an electronic device according to an embodiment of the disclosure. FIG. 2B is a schematic cross-sectional view taken along a line GG' depicted in FIG. 2A. FIG. 2C is a schematic cross-sectional view taken along a line HH' depicted in FIG. 2A. It should be noted that the reference numerals and a part of the contents in the embodiment of FIG. 1A to FIG. 1H are also used to describe the embodiments of FIG. 2A to FIG. 2C, in which the same reference numerals are used to represent identical or similar elements, and thus descriptions of the same technical contents are omitted. Please refer to the descriptions of the previous embodiments for the omitted contents, which will not be repeated hereinafter.

A difference between an electronic device 20 of FIG. 2A to FIG. 2C and the electronic device 10 of FIG. 1A includes that the connection line 114 and the connection line 124 of the electronic device 20 are electrically connected through an opening OP1 of the first insulation layer I1.

Referring to FIG. 2A and FIG. 2B, the first insulation layer I1 further includes the opening OP1. The connection line 114 and the connection line 124 are electrically connected to each other through the opening OP1. For instance, the connection line 124 is disposed in the opening OP1 and is connected to the connection line 114. The opening OP1 is located between the overlapping region OR1 and the sub-pixel PX.

Referring to FIG. 2A and FIG. 2C, in this embodiment, the first insulation layer I1 further includes an opening OP2, and the connection line 114a and the connection line 124a are electrically connected to each other through the opening OP2. For instance, the connection line 124a is disposed in the opening OP2 and is connected to the connection line 114a.

In addition, in the foregoing embodiments, as at least one of the signal connection line C1 and the repair line RJ is designed to be disposed in the electronic device 10, sequential names of the connection lines, segments, connection electrodes, and contact windows may be determined. For instance, when the electronic device 10 includes the signal connection line C1 and the repair line RJ, the connection line 114 and the connection line 124 related to the signal line C1 may respectively be named as a first connection line and a second connection line, and the segment 112 and the segment 122 related to the signal connection line C1 may respectively be named as a first segment and a second segment. The connection electrode 132 may be named as a first connection electrode. The connection line 114a and the connection line 124a related to the repair line RJ may respectively be named as a third connection line and a fourth connection line, and the segment 112a and the segment 122a related to the repair line RJ may respectively be named as a third segment and a fourth segment. The connection electrode 132a may be named as a second connection electrode. When the electronic device 10 includes the signal connection line C1 or the repair line RJ and the repair line RJ is taken for example, the connection line 114a and the connection line 124a related to the repair line RJ may respectively be named as the first connection line and the second connection line as well. The segment 112a and the segment 122a related to the repair line RJ may respectively be named as the first segment and the second segment as well. The connection electrode 132a may be named as the first connection electrode as well. Similarly, the rest of the related elements (e.g., the contact windows, the openings, or other elements) may be referred to the above and may be called by other sequential names.

In view of the foregoing, in a bonding region or a pressing region, the segment of the first conductive layer is not overlapped with the segment of the second conductive layer, and process difficulty in the chip bonding process can thereby be lowered. For instance, since the second insulation layer is less likely to be peeled off in the bonding process of the electronic element, the bonding process of the electronic element may be performed with reduced difficulty. In this embodiment, the non-overlapping segments (e.g., the segment 112 is not overlapped the segment 122 and may be regarded as having one layer respectively) are connected to the overlapping connection lines (e.g., the connection line 124 and the connection line 114, and the overlapping region OR1 may be regarded as having two layers of conductive layers) at the overlapping region, and that the signal connection line connected to the signal line has lower electrical impedance. In other words, the bonding process with reduced difficulty is maintained and at the same time, electrical impedance of the signal connection line connected to the signal line may be lowered in this embodiment. In this way, the problem of heat concentration on a portion of a conductive line (e.g., the signal connection line) with greater electrical impedance and/or heat accumulation of a plurality of conductive lines (e.g., the signal connection line) at a high resolution (e.g., a resolution of 4K or greater, preferably 8K or greater) in the electronic device (e.g., a display panel) is addressed. Therefore, an electronic device (e.g., a display panel) may be less prone to mura at an edge (e.g., a corner) of the electronic device (e.g., a display panel) at a high resolution (e.g., a resolution of 4K or greater, preferably 8K or greater).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:
   a substrate, having a display region and at least one peripheral region located on at least one side of the display region;
   at least one subpixel, located at the display region;
   at least one signal line, disposed on the substrate and electrically connected to the at least one subpixel;
   a first conductive layer, disposed on the substrate and comprising:
      a plurality of first segments, disposed on the at least one peripheral region; and
      at least one first connection line, disposed on the at least one peripheral region and connected to at least one of the plurality of first segments;
   a second conductive layer, disposed on the substrate and comprising:
      a plurality of second segments, disposed on the at least one peripheral region, wherein at least one of the plurality of second segments is corresponding to and separated from the at least one of the plurality of first segments; and
      at least one second connection line, disposed on the at least one peripheral region and connected to the at least one of the plurality of second segments, wherein the at least one second connection line is overlapped with the at least one first connection line in a normal direction of the substrate to basically form an overlapping region, and the at least one first connection line and the at least one second connection line are electrically connected to each other to form a portion of at least one signal connection line and to be electrically connected to the at least one signal line;
   a first insulation layer, disposed between the first conductive layer and the second conductive layer;
   a second insulation layer, disposed on the second conductive layer, wherein the first insulation layer and the second insulation layer have at least one first contact window corresponding to the at least one of the plurality of first segments, the second insulation layer further comprises at least one second contact window corresponding to the at least one of the plurality of second segments, a thickness of the second insulation layer on the at least one first connection line and the at least one second connection line is X, a thickness of the second insulation layer on the at least one of the plurality of first segments and the at least one of the plurality of second segments is Y; and
   a third conductive layer, disposed on the substrate and comprising:
      at least one first connection electrode, disposed on the second insulation layer and electrically connected to the at least one of the plurality of first segments and the at least one of the plurality of second segments through the at least one first contact window and the at least one second contact window, wherein the at least one first connection electrode, the at least one of the plurality of first segments, and the at least one of the plurality of second segments basically form at least one pressing pad and to be electrically connected to the at least one signal connection line; and
      at least one electrode, disposed at the at least one subpixel.

2. The electronic device of claim 1, further comprising:
   at least one electronic element, having at least one bonding pad corresponding to the pressing pad to be electrically connected to the at least one subpixel.

3. The electronic device of claim 2, wherein the at least one electronic element comprises a circuit board or a chip.

4. The electronic device of claim 1, further comprising:
   at least one driver circuit, disposed on the substrate and electrically connected to the at least one signal line and the at least one signal connection line.

5. The electronic device of claim 1, wherein the at least one signal line comprises at least one scan line or at least one data line.

6. The electronic device of claim 1, wherein
the first insulation layer and the second insulation layer further comprise at least one third contact window,
the second insulation layer further comprises at least one fourth contact window, and
the third conductive layer further comprises at least one second connection electrode disposed on the second insulation layer and electrically connected to the at least one of the plurality of first segments and the at least one of the plurality of second segments through the at least one third contact window and the at least one fourth contact window, wherein the at least one third contact window and the at least one fourth contact window are located between the overlapping region and the at least one subpixel.

7. The electronic device of claim 1, wherein the first insulation layer further comprises at least one opening, the at least one first connection line and the at least one second connection line are electrically connected to each other through the at least one opening, and the at least one opening is located between the overlapping region and the at least one subpixel.

8. The electronic device of claim 1, wherein the at least one first connection line comprises a plurality of first openings, the at least one second connection line comprises a plurality of second openings, and at least a portion of the plurality of first openings and at least a portion of the plurality of second openings are located in the overlapping region.

9. The electronic device of claim 8, wherein at least one of the plurality of first openings is overlapped with at least one of the plurality of second openings.

10. The electronic device of claim 8, wherein at least one of the plurality of first openings is overlapped completely with at least one of the plurality of second openings.

11. The electronic device of claim 1, wherein the at least one of the plurality of second segments is not overlapped with the at least one of the plurality of first segments in the normal direction of the substrate.

12. The electronic device of claim 11, wherein the at least one of the plurality of first segments has at least two first segments, the at least one of the plurality of second segments has at least two second segments, and the at least two second segments are not overlapped with the at least two first segments in the normal direction of the substrate.

13. The electronic device of claim 12, wherein one of the at least two first segments is located between the at least two second segments.

14. The electronic device of claim 1, wherein $X>Y$.

* * * * *